UNITED STATES PATENT OFFICE.

HORATIO NELSON, OF NEW YORK, N. Y.

IMPROVEMENT IN PAINT COMPOUNDS.

Specification forming part of Letters Patent No. 139,729, dated June 10, 1873; application filed April 26, 1873.

*To all whom it may concern:*

Be it known that I, HORATIO NELSON, of the city, county, and State of New York, have invented a new and Improved Paint Compound; and I do hereby declare that the following is a full, clear, and exact description of the same.

I make a compound for paint of plumbago, clay, silicate of soda or potash, and oil. I use ninety parts of plumbago to ten of clay, grinding them with sufficient silicate of soda or potash, and oil to secure adhesiveness, which is considerably enhanced by the use of the clay.

This compound possesses antiseptic properties, which render it more desirable than other paints where such properties are not found.

Having thus described my invention, what I claim as new, and desire to secure by Letters Patent, is—

A paint composed of plumbago, clay, silicate of potash or soda, and oil, in about the proportions specified.

HORATIO NELSON.

Witnesses:
A. P. THAYER,
ALEX. F. ROBERTS.